United States Patent [19]

Oda

[11] Patent Number: 4,647,274
[45] Date of Patent: Mar. 3, 1987

[54] IN-MOLD COATING APPARATUS

[75] Inventor: Masamitsu Oda, Hiroshima, Japan

[73] Assignee: Mazda Motor Corporation, Hiroshima, Japan

[21] Appl. No.: 751,978

[22] Filed: Jun. 28, 1985

[30] Foreign Application Priority Data

Jul. 2, 1984 [JP] Japan .......................... 59-100448[U]

[51] Int. Cl.$^4$ ...................... B29C 33/48; B29C 45/76; B29C 43/58
[52] U.S. Cl. .................................. 425/135; 425/556; 425/565; 425/437
[58] Field of Search ............... 425/546, 549, 4 R, 564, 425/565, 437, 135, 556, 565; 264/255, 335; 249/66 R, 155

[56] References Cited

U.S. PATENT DOCUMENTS

| 3,797,984 | 3/1974 | Yago et al. | 425/549 |
| 4,076,788 | 2/1978 | Ditto | 264/255 |
| 4,092,385 | 5/1978 | Balevski et al. | 264/328.7 |
| 4,106,887 | 8/1978 | Yasuike et al. | 425/4 R |
| 4,133,858 | 1/1979 | Hayakawa et al. | 264/328.7 |
| 4,153,231 | 5/1979 | Hayakawa et al. | 425/546 |
| 4,247,515 | 1/1981 | Olabisi | 264/500 |

FOREIGN PATENT DOCUMENTS 581672 11/1978 Japan .

Primary Examiner—Willard E. Hoag
Attorney, Agent, or Firm—Burns, Doane, Swecker & Mathis

[57] ABSTRACT

An in-mold coating apparatus which comprises movable and fixed molds which when mated together defines a molding cavity, and an injector assembly for injecting a plasticized coating material into the molding cavity to form a coated layer on a primary molded product within the molding cavity. The movable mold has an opened position at which the complete molded product with the coated layer thereon can be removed out of the molding cavity, a first closed position at which the primary molded product can be formed and a second closed position at which a space is formed between the movable mold and the primary molded product for the formation of the coated layer. The injector assembly has a tubular rod having one end adapted to selectively close and open an injection opening, and also having an air passage defined therein for the application of a blast of compressed air into the space to urge the primary molded product against the fixed mold.

10 Claims, 2 Drawing Figures

IN-MOLD COATING APPARATUS

BACKGROUND OF THE INVENTION

The present invention generally relates to the molding of a multi-layered molded product having a primary molded product and one or more layers of plastic material laminated or coated on the primary molded product. More particularly, the present invention relates to an in-mold coating apparatus for the manufacture of the multi-layered molded product.

In the field of automobile industry, the use of plastic material as a material for component parts of an automobile body structure such as, for example, bonnets, inner door panels and fenders, has now become popular not only because it contributes to the reduction in weight of an automobile as a whole, but also because some plastics have a physical property superior to metal.

However, it is generally experienced that as compared with the plastics containing no fiber reinforcement the fiber-reinforced plastics when plasticized generally tends to exhibit a poor fluidity and, accordingly, when a sheet-like or plate-like product is manufactured from fiber-reinforced plastics by the use of a plastics molding technique, the molded product is susceptible to the formation of pinholes. Where the sheet-like or plate-like molded product is subsequently painted, or otherwise formed with a surfacing coating, and the applied paint or coating is then dried by the irradiation of, for example, infrared rays of light, the presence of the pinholes necessarily deteriorates the surface finish of the final product because some or all of the pinholes expand to rupture under the influence of heat of elevated temperature.

In view of the foregoing, a practice is generally employed to form or laminate a coating layer on the surface of the sheet-like or plate-like molded product to cover up the indentations present on the surface of the molded product by the use of an in-mold coating technique.

The formation of the coating layer on the molded product according to the in-mold coating technique is carried out by separating mold halves from each other a slight distance corresponding to the desired thickness of the subsequently formed coating layer after the formation of the molded product within the molding cavity, and then injecting a plasticized material for the coating layer into the space which is defined between the molded product and a molding surface of one of the mold halves as a result of the separation of the mold halves through the slight distance. In order for the final molded product, comprised of the primary molded product having the coating layer, to have a uniform thickness substantially all over the entire area thereof, the molded product should be firmly retained by the other of the mold halves at the time of separation of the mold halves from each other.

However, it is well known that, when the mold halves are separated from each other regardless of the purpose for which they are separated, that is, whetherever they are separated for opening the mold assembly or whetherever they are separated for the injection of the coating material, a negative pressure is induced within the molding cavity before the latter becomes communicated with the atmosphere, which negative pressure acts to drag the molded product to lift off from the molding surface of said other of the mold halves.

According to the prior art exemplified by the Japanese Patent Publication No. 58-1672, published Jan. 12, 1983, there is disclosed a mold assembly comprising movable and fixed molds, a knock-out rod slidably and drivingly extending through the fixed mold for ejecting the final molded product, a plurality of retaining rods slidably and drivingly extending through the movable mold, and an injection cylinder for injecting a plasticized coating material into the molding cavity through a passage defined in the movable mold. The retaining rods are driven relative to the movable mold, when the latter is moved away from the fixed mold a distance substantially equal to the desired thickness of the eventually formed coating layer on the primary molded product, to allow their tips adjacent the fixed mold to urge the primary molded product against the fixed mold thereby avoiding any possible lift-off of the primary molded product from the fixed mold. This patent publication describes the formation of the primary molded product by injecting a plasticized material into the molding cavity from another injection cylinder separate of that for the injection of the coating material.

It is pointed out that, where the primary molded product is formed by injecting the plasticized material into the molding cavity before the formation of the coating layer thereon, the actual injection of the coating material must be suspended until the primary molded product solidifies completely, or otherwise markings of the retaining rods will be formed on the surface of the primary molded product. It is also pointed out that, if the primary molded product is pliable or still soft, local portions of the primary molded product other than that depressed by the retaining rods will be susceptible to the localized lift-off from the fixed mold under the influence of the negative pressure induced within the molding cavity as the movable mold moves away from the fixed mold.

SUMMARY OF THE INVENTION

Accordingly, the present invention has been developed with a view to substantially eliminating the above described disadvantages and inconveniences inherent in the prior art apparatuses and has for its essential object to provide an improved apparatus effective to manufacture the final molded product of uniform or substantially uniform thickness all over the entire area thereof.

In order to accomplish this object, the present invention provides an in-mold coating apparatus which comprises movable and fixed molds, and an injector assembly. The movable mold are supported for movement relative to and in a direction close towards and away from the fixed mold and having an opened position, at which the movable and fixed molds are separated from each other in readiness for the removal of a complete molded product, and first and second closed positions at which the movable and fixed molds are closed together with a molding cavity defined therebetween. The first closed position for the movable mold is for the molding of a primary molded product complemental in shape and size to that of the minimal molding cavity, the complete molded product being complemental in shape and size to that of the maximal molding cavity.

The injector assembly is rigidly mounted on one of the movable and fixed molds and comprises a generally elongated hollow body, having an interior defined therein and adapted to accommodate a substantial quantity of plasticized molding material fed from a source of the plasticized molding material, an air supply passage means provided in the interior of the elongated hollow body and communicated with a source of compressed air, and an air shut-off valve means arranged in the air supply passage means. The elongated hollow body includes a nozzle member having an injection opening defined therein in communication with the interior thereof for the injection of the plasticized molding material therethrough into the molding cavity, and a plug member disposed in the nozzle member for selectively opening and closing the injection opening. The injection of the molding material into the molding cavity is effected when the plug member opens the injection opening subsequent to the molding of the primary molded product within the minimum molding cavity with the movable mold held in the first closed position and after the movable mold has been moved to the second closed position.

The air shut-off valve means is operable during a period, in which the movable mold is being moved from the first closed position to the second closed position, to apply a blast of compressed air from the compressed air source through the air-supply passage means and into the molding cavity, and the compressed air so supplied into the molding cavity acts to urge the primary molded product against the other of the movable and fixed molds thereby avoiding a possible separation of the primary molded product from said other of the movable and fixed molds.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
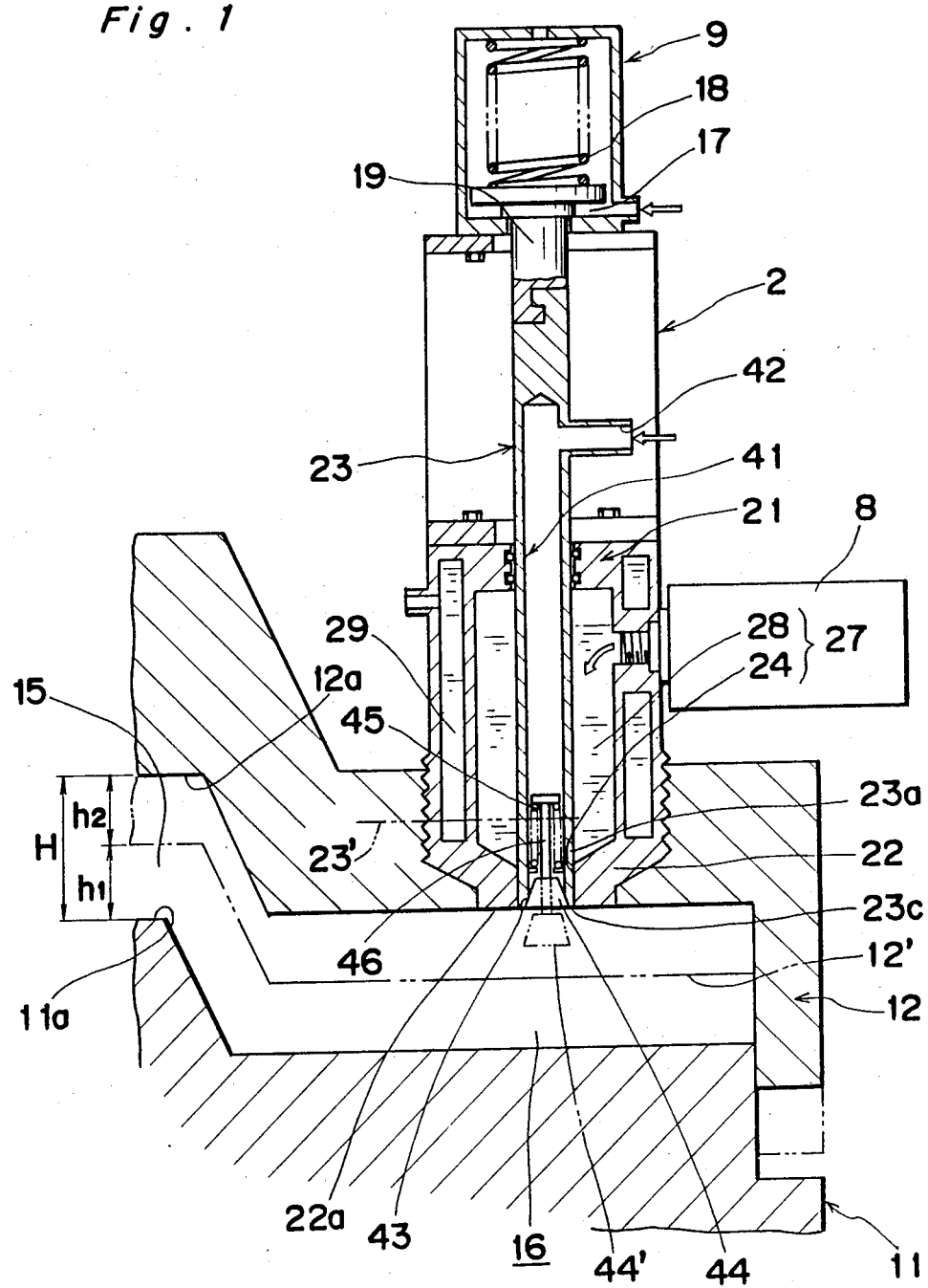
FIG. 1 is a longitudinal sectional view of a portion of a mold assembly showing the details of an in-mold coating device according to the present invention.

Referring now to the accompanying drawings, there is shown a mold assembly 1 of, for example, a press-molding apparatus Z embodying the present invention. The mold assembly 1 shown therein is, for the purpose of the description of the present invention, assumed as designed for the manufacture of, for example, a bonnet or fender, of an automobile body structure from plastics and comprises a lower mold 11, rigidly mounted on a fixed platen 3, and an upper mold 12 secured to a movable platen 4 through a raiser 7 having a heating device built therein. The movable platen 4 carrying the upper mold 12 can be moved by a press (not shown), or any other suitable hydraulic drive or mold clamp, between raised and lowered positions with the upper mold 12 consequently moving selectively toward and away from the lower mold 11. The lowered position for the movable platen 4 is divided into tight and loose positions assumed by the upper mold 12 one at a time, it being, however, to be noted that, so long as the movable platen 4 is held in the lowered position and regardless of whether the upper mold 12 is in the loose position or whether it is in the tight position, the upper mold 12 is mated with the lower mold 11, i.e. the mold assembly 1 as a whole is closed, to define a molding cavity 15 between the upper and lower molds 12 and 11. The spacing between the tight and loose positions is controlled by at least one push-back cylinder 5 comprising telescopically relatively movable two cylinder components, which cylinder 5 is interposed between the movable and fixed platens 4 and 3 exteriorly of the mold assembly 1 through a robust spacer 6. The push-back cylinder 5 is so designed and so operable that, when and so long as the cylinder components expand axially relative to each other, the lowering of the movable platen 4 permits the upper mold 12 to assume the loose position at which the molding cavity 15, i.e., the space between a molding surface 12a of the upper mold 11, which faces towards the lower mold 11, and a mating molding surface 11a of the lower mold 11 which faces towards the upper mold 12, represents a thickness shown by $H(=h_1+h_2)$, but when and so long as the cylinder components retract axially close to each other, the lowering of the movable platen 4 permits the upper mold 12 to assume the tight position, shown by the double-dotted chain line 12', at which the molding cavity 15 represents a thickness $h_1$ smaller than the thickness H.

The molding cavity 15 when presenting the thickness H, which cavity is hereinafter referred to as "maximum molding cavity", is used to make a final molded product ready for use on the automobile body structure, whereas the molding cavity 15 when presenting the reduced thickness $h_1$, which cavity is hereinafter referred to as "minimum molding cavity", is used to define the thickness of a preform 10, i.e., the thickness to which a fiber-reinforced plastic material or sheet is desired to be compressed or molded. As will become clear from the subsequent description, the difference in thickness between the maximum and minimum molding cavities, shown by $h_2$ in FIG. 1, represents a space between the top surface of the preform 10 and the molding surface 12a of the upper mold 12, into which space is injected a coating material of, for example, thermosetting polyurethane type for coating the preform 10 to make the final molded product.

On one side of the mold assembly, a tab forming cavity 16 is defined between the upper and lower molds 12 and 11 and in communication with the molding cavity 15, the thickness of said tab forming cavity 16 being equally variable with that of the molding cavity 15 dependent on the position of the upper mold 12 relative to the lower mold 11.

Laterally of the mold assembly 1 and within a space between the movable platen 4 and the upper mold 12, at least one injector 2 is rigidly mounted on the upper mold 12 immediately above and in alignment with the tab forming cavity 16. As best shown in FIG. 1, the injector 2 comprises a generally cylindrical hollow body 21 having an upper end closed and the opposite, lower end formed into a nozzle 22 having an injection port 24 defined therein in coaxial relation with the body 21, and is threadingly mounted on the upper mold 12 with the injection port 24 confronting the tab forming cavity 16 when the movable platen 4 is in the lowered position. The interior of the body 21 serves as a reservoir 28 for containing a quantity of coating material, for example, thermosetting polyurethane resin in fluid state, supplied thereinto from a static mixer 8, said reservoir 28 and the injection port 24 altogether constituting a paint flow passage 27 through which the coating material from the static mixer 8 may flow under pressure into the tab forming cavity 16 and then into the molding cavity 15 above the preform 10. The wall of the cylindrical body 21 has defined therein a water jacket 29 surrounding exteriorly of the reservoir 28 for the flow of a cooling water effective to avoid the premature reaction of compositions of the coating material under the ambient temperature which would result in the premature hardening of the coating material within the reservoir 28.

The injector 2 also comprises a tubular shut-off rod 23 having an upper end closed and rigidly coupled with a piston rod 19 forming a part of a pneumatically operated cylinder 9 mounted on top of the cylindrical body 21, and a lower end 23a adapted to selectively open and close the injection port 24, a substantially intermediate portion thereof extending slidably, but fluid-tightly through the closed end of the cylindrical body 21 in axial alignment with the latter. The shut-off rod 23 is movable between closed and opened positions and is normally urged to the closed position by a biasing spring 18 forming another part of, and incorporated in, the pneumatically operated cylinder 9. This shut-off rod 23 is so sized relative to the stroke of the piston rod 19 that, when and so long as the shut-off rod 23 is in the closed position by the action of the spring 18, the annular end face 23c of the lower end 23a of the shut-off rod 23 can be held in flush with the annular end face 22a of the nozzle 22 around the injection port 24, thereby closing the injection port 24. The shut-off rod 23 can be moved to the opened position against the spring 18 when a compressed air of a pressure sufficient to overcome the biasing force of the spring 18 is introduced into a pressure chamber 17 of the pneumatically operated cylinder 9, at which time the annular end face 23c of the shut-off rod 23 is lifted to a level indicated by the phantom line 23', thus completely opening the injection port 24 to permit the coating material within the reservoir 28 to be injected into the tab forming cavity 16 and then into the molding cavity 15 above the preform 10.

The shut-off rod 23 has defined therein an axial air passage 41 extending coaxially of the rod 23 in a length greater than the axial length of the cylindrical body 21, one end of said axial passage 41 adjacent the closed end of the rod 23 being communicated with a source of compressed air (not shown) through an air supply port 42 whereas the other end thereof opens downward and towards the lower molding 11. The inner peripheral edge of the lower open end 23a of the rod 21 is radially outwardly enlarged in a direction exteriorly of the axial passage 42 so as to define a generally frusto-conical valve seat 43 forming a part of a normally closed check valve assembly.

The check valve assembly referred to above includes, in addition to the frusto-conical valve seat 43, a generally frusto-conical valve member 44, complemental in shape to the frusto-conical valve seat 43 and movable between opened and closed positions in a direction axially of the axial passage 41. The valve member 44 is normally urged to the closed position as shown by the solid line in FIG. 1 by the action of a coiled spring 45 inserted into the axial passage 41 and interposed between a carrier rod 46, fast or integral with the valve member 44, and a spring seat protruding radially inwardly from the shut-off rod 23 into the axial passage 41. This valve member 44 can move towards the opened position, shown by the phantom line 44', against the coiled spring 45 when the compressed air of a predetermined pressure sufficient to overcome the spring 45 is supplied into the axial passage 41 by way of the supply port 42, but can automatically return to the closed position by the action of the spring 45 immediately when the supply of the compressed air into the axial passage 41 is interrupted. The source of the compressed air to be supplied into the axial passage 41 through the supply port 42 may comprise a compressor which may be driven in response to a drive signal generated from a detector (not shown) upon the movement of the upper mold 12 from the tight position towards the loose position after the movable platen 4 carrying the upper mold 12 has been driven to the lowered position by the press and after the subsequent formation of the preform 10, which drive signal may be the one used to activate the push-back cylinder 5 to expand the cylinder components away from each other. Where the drive signal for activating the push-back cylinder 5 is used also for driving the compressor for the supply of the compressed air into the axial passage 41, it is preferred to delay the activation of the push-back cylinder 5 for a predetermined delay time thereby to compensate for a delay in opening of the check valve assembly, that is, it is preferred to allow the check valve assembly to open a predetermined short time earlier than the activation of the push-back cylinder 5.

The press-molding apparatus Z equipped with the in-mold coating device operates in the following manner.

At the outset, while the movable platen 4 is lifted by the press to the raised position with the molds 12 and 11 separated away from each other, a fiber-reinforced plastic plate (not shown) is placed on the molding surface 11a of the lower mold 11. Thereafter, the movable platen 4 is lowered by the press towards the lowered position while the push-back cylinder 5 has been activated to expand the cylinder components thereof away from each other. The upper mold 12 moving together with the movable platen 4 arrives at the loose position when the undersurface of the movable platen is brought into contact with the top of the robust spacer 6, with the upper mold 12 consequently brought in position ready to compress the plastic plate in cooperation with the lower mold 11.

Figure 2:
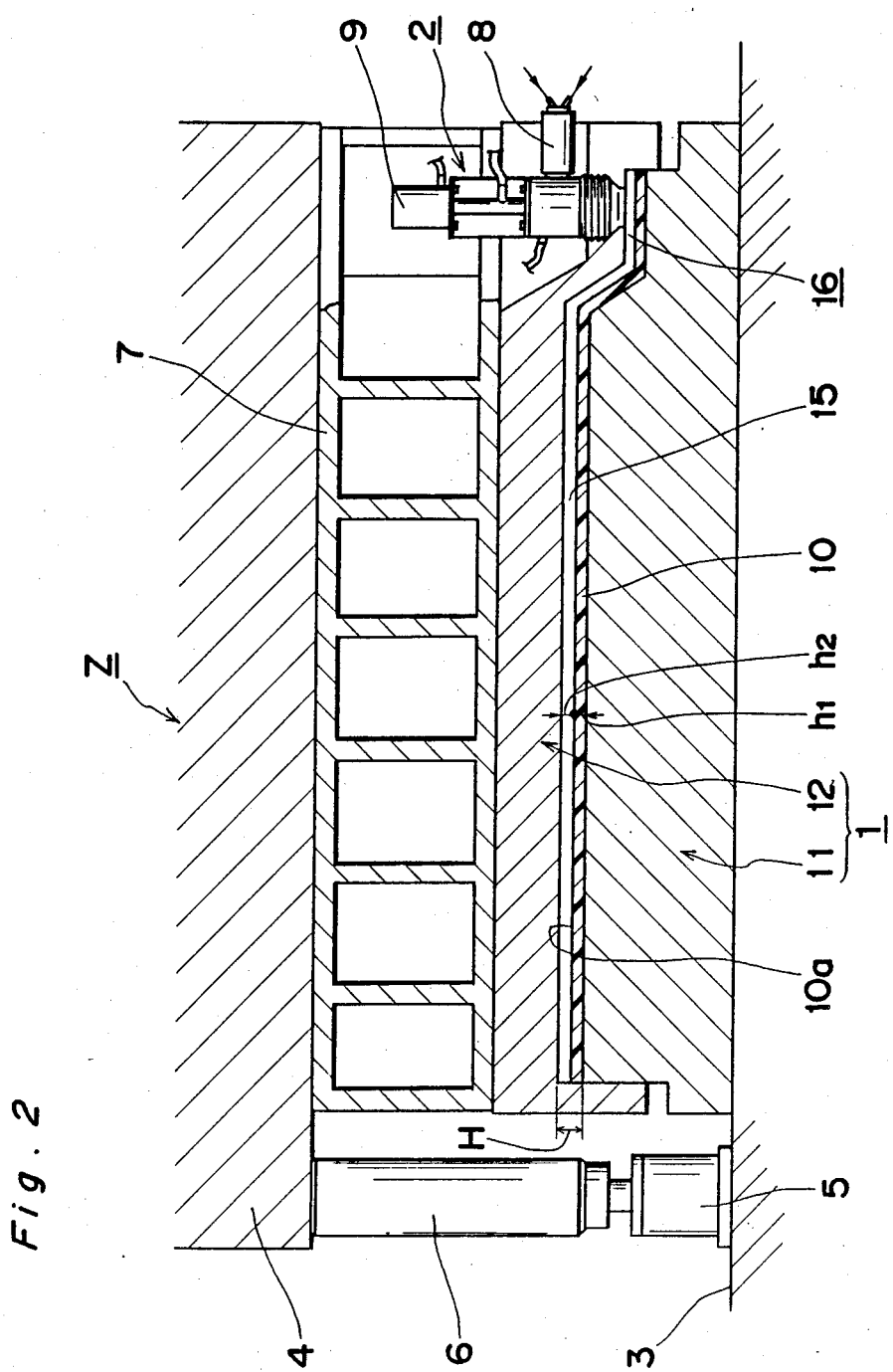
FIG. 2 is a longitudinal sectional view of the mold assembly equipped with the in-mold coating device.

When a starter switch (not shown) is manipulated to activate the push-back cylinder 5 to cause the cylinder components to retract close towards each other and at the same time to operate the press to apply a pressure onto the movable platen 4, the upper mold 12 is brought to the tight position with the plastic plate consequently compressed between the upper and lower molds 12 and 11 thereby to form the preform 10 within the molding cavity 15 to a thickness corresponding to the thickness $h_1$ of the minimum molding cavity. Subsequent to the formation of the preform 10, the push-back cylinder 5 is again activated, while the press has been brought in an inoperative position, to expand the cylinder components away from each other to bring the upper mold 12 to the loose position as shown in FIG. 2 thereby to form the space of the thickness $h_2$ between the top surface of the preform 10 and the molding surface 12a of the upper mold 12.

However, as the upper mold 12 is moved from the tight position towards the loose position subsequent to the formation of the preform 10, a negative pressure may be developed as a result of the back pressure on the upper mold 12 and, consequently, the preform 10 resting on the lower mold 11 may be pulled to lift or "float" within the molding cavity. This undesirable possibility can be successfully eliminated according to the present invention by injecting a blast of compressed air into an upper region of the molding cavity above the preform 10 in the manner which will now be described.

When a control signal for activating the push-back cylinder 5 so as to expand the cylinder components away from each other to move the upper mold 12 from the tight position to the loose position after the complete press-molding of the preform 10, the compressor for the supply of the compressed air is driven shortly before the activation of the push-back cylinder 5 to supply into the air passage 41 the compressed air of a pressure sufficient to open the normally closed check valve, that is, to move the valve member 44 towards the opened position 44' against the spring 45, it being, however, to be noted that the movement of the valve member 44 from the closed position towards the opened position by the effect of the pressure inside the axial passage 41 starts simultaneously with the movement of the upper mold 12 from the tight position towards the loose position because, unless the upper mold 12 moves towards the loose position, the bottom of the valve member 44 is in contact with the top surface of the preform 10 while closing the open end of the axial passage 41.

As the upper mold 12 starts moving towards the loose position as a result of the activation of the cylinder 5 shortly after the supply of the compressed air into the air passage 41, the space is formed between the top surface 10a of the preform 10 and the molding surface 12a of the upper mold 12 while the valve member 44 is gradually separated from the valve seat 43, allowing a blast of compressed air to flow into such space. The compressed air so injected into the space above the preform 10 quickly fills up in such space, counteracting with the negative pressure developed by the movement of the upper mold towards the loose position while, at the same time, suppressing the preform 10 against the lower mold 11. The blast of the compressed air into the molding cavity above the preform 10 continues until the upper mold 12 arrives at the loose portion. Thus, it is clear that, until the molding cavity 15 increases in volume or thickness from the minimum value to the maximum value, the preform 10 is continuously suppressed against the lower mold 11 by the action of the pneumatic pressure of the compressed air filling up the upper region of the space above the preform 10, with no possibility of the preform 10 being lifted afloat.

Simultaneously with the arrival of the upper mold 12 at the loose position as shown in FIG. 2, the compressed air is introduced into the pressure chamber 17 of the pneumatically operated cylinder 9 to retract the piston rod 19 against the spring 18 thereby to lift the shut-off rod 23 with the injection port 24 in the nozzle 22 consequently opened. As soon as the injection port 24 is so opened, the coating material within the reservoir 28 is injected under pressure into, and then spreads in, the molding cavity so as to cover uniformly the entire top surface 10a of the preform 10 while filling up the upper region of the surface above the preform 10. It is to be noted that the compressed air once introduced into the molding cavity in the manner described above is, as the coating material is injected thereinto, allowed to escape to the atmosphere through minute vent holes (not shown) defined in the upper mold 12 or in both of the upper and lower molds 12 and 11.

The coating material so injected is, while still pressed by the upper mold 12 through the movable platen 4, heated in contact with the upper mold 12, then heated by the heating device built in the raiser 7, to initiate the chemical reaction of the coating material and is thereafter allowed to cool, thereby completing the formation of the thermoset plastic coating of the controlled thickness $h_2$ on the preform 10. After the solidification of the coating material, the movable platen 4 is moved from the lowered position towards the raised position together with the upper mold 12, thereby opening the mold assembly 1 in readiness for the removal of the completely coated preform, that is, the final product from the mold assembly.

Although the present invention has been fully described in connection with the preferred embodiment with reference to the accompanying drawings, it is to be noted the various changes and modifications are apparent to those skilled in the art. By way of example, although in the foregoing embodiment the plastic plate has been used as a starting material for the manufacture of, for example, the bonnet made up of the preform having the glass-reinforced plastic coating and, therefore, the press-molding apparatus Z including the injector 2 may be considered as an in-mold coating apparatus, no starting material such as the plastic plate may be always necessary and the apparatus itself may be used as an injection molding machine. However, considering the purpose for which the present invention has been developed, and where the apparatus shown and described is to be used as the injection molding machine, the preform may be formed in situ in the illustrated apparatus. Accordingly, the press-molding apparatus having the injector for dual purpose of injecting the compressed air and in-mold coating should be understood as interchangeable with the in-mold coating apparatus.

Moreover, instead of the pneumatically operated cylinder 9, either a hydraulically operated cylinder, or an electromagnetic drive or any other mechanical drive may be used. This also applied to the push-back cylinder 5.

Accordingly, such changes and modifications are to be understood as included with the true scope of the present invention as defined by the appended claims unless they depart therefrom.

I claim:

1. An in-mold coating apparatus which comprises in combination:

movable and fixed molds,
the movable mold being supported for movement relative to and in a direction towards and away from the fixed mold and having an opened position, at which the movable and fixed molds are separated from each other sufficiently for removal of a complete molded product, and first and second closed positions at which the movable and fixed molds are closed together with a molding cavity defined therebetween,
the fixed mold and the movable mold at the first closed position defining a first molding cavity for the molding of a primary molded product complemental in shape and size to that of the first molding cavity, the fixed mold and the movable mold at the second closed position defining a second molding cavity for the molding of a complete molded product being complemental in shape and size to that of the second molding cavity, said second molding cavity being larger than said first molding cavity;

mold drive means for driving the movable mold from the first closed position to the second closed position subsequent to the molding of the primary mold product;

means for urging a primary molded product against one of the movable and fixed molds while the movable mold is driven from the first closed position to the second closed position, whereby the primary molded product remains in contact with the one of the movable and fixed molds and the other mold may become spaced apart from the primary molded product, said urging means including an injector assembly rigidly mounted on the other mold and comprising a generally elongated body, an air supply passage means provided in the the elongated hollow body and communicated with a source of compressed air, an air shut-off valve means arranged in the air supply passage means and means for opening said air shut-off valve means responsive to movement of the movable mold from the first closed position to the second closed position to apply compressed air from the compressed air source through the air-supply passage means and into the molding cavity; and means for injecting plasticized molding material into the mold cavity after the movable mold has been moved to the second closed position, whereby the plasticized molding material may be injected into the space between the other mold and the primary molded product, the injecting means including a chamber provided in the elongated body for containing a quantity of plasticized molding material fed from a source of the plasticized molding material, a nozzle provided in the elongated body having an injection opening in communication with the chamber and adapted to inject the plasticized molding material into the molding cavity, a plug member disposed in the nozzle and means for selectively moving the plug member relative to the injection opening to selectively open the injection opening after the movable mold has been moved to the second closed position.

2. The apparatus as claimed in claim 1, wherein the air shut-off valve means opens to apply a blast of compressed air when the pressure of the compressed air introduced into the air passage means exceeds a predetermined value.

3. The apparatus as claimed in claim 2, wherein the air supply passage means comprises a generally tubular member having one end communicated with the compressed air source, and wherein the air-shut off valve means comprises a valve member adapted to selectively open end close the other end of the tubular member, and a biasing element having a biasing force of the predetermined value for urging the valve member to close the other end of the tubular member, the valve member being displaced to allow the introduction of the blast of compressed air into the molding cavity when the compressed air pressure exceeds the biasing force.

4. The apparatus as claimed in claim 3, wherein the valve member is of a generally frusto-conical shape tapering in a direction towards the interior of the tubular member, and wherein said other end of the tubular member having its inner peripheral edge shaped in complemental relation to the shape of the valve member.

5. The apparatus as claimed in claim 1, wherein the air supply passage means extends coaxially within the elongated body, and wherein an interior portion of the elongated body delimited exteriorly around the air supply passage means defines a material passage through which the plasticized molding material flows.

6. The apparatus as claimed in claim 5, wherein a wall of the elongated body has a coolant jacket for the circulation of a liquid coolant therethrough.

7. The apparatus as claimed in claim 5, further comprising a drive unit, and wherein the air supply passage means comprises a generally tubular member extending coaxially through the interior portion of the elongated body for movement between first and second member positions in a direction axially of the elongated body and having an axial air passage defined therein, the axial air passage having one end communicated with the compressed air source and the other end adapted to be selectively closed and opened by the air shut-off valve means, the tubular member having one end drivingly coupled with the drive unit for moving the tubular member between the first and second member positions, the plug member being constituted by the other end of the tubular member, the tubular member being moved from the first position towards the second position with the other end of the tubular member opening the injection opening to allow the injection of the plasticized molding material after the movable mold has been moved to the second closed position.

8. The apparatus as claimed in claim 7, wherein the air-shut off valve means comprises a valve member adapted to selectively open end close the other end of the axial air passage in the tubular member, and a biasing element for urging the valve member to close the other end of the axial air passage, the valve member being displaced to open the other end of the axial air passage for the introduction of the blast of compressed air into the molding cavity when the compressed air attains a pressure higher than the biasing force of the biasing element.

9. The apparatus as claimed in claim 3, wherein the valve member when positioned to close the other end of the tubular member is substantially flush with a surface of the other mold, said surface partially defining the molding cavity.

10. The apparatus as claimed in claim 8, wherein the valve member when positioned to close the other end of the tubular member is substantially flush with a surface of the other mold, said surface partially defining the molding cavity.

* * * * *